United States Patent [19]
Nagano et al.

[11] 3,737,495
[45] June 5, 1973

[54] METHOD FOR MANUFACTURING TUBULAR FILMS OF THERMOPLASTIC RESINS

[75] Inventors: Hiroshi Nagano, Hideo Tomioka, Akira Yamataka, Hirohiko Yoshida, all of Nagahama-shi, Shiga-ken, Japan

[73] Assignee: Mitsubishi Jushi Kabushiki Kaisa Chiyoda-Ku, Tokyo-To, Japan

[22] Filed: Sept. 29, 1970

[21] Appl. No.: 76,639

Related U.S. Application Data

[62] Division of Ser. No. 750,036, Aug. 5, 1968, Pat. No. 3,635,634.

[52] U.S. Cl. ............264/95, 264/209, 264/210 R, 264/237, 264/310, 264/348
[51] Int. Cl. ......B29d 23/04, B29c 25/00, B29d 7/02
[58] Field of Search...................264/95, 89, 237, 264/209, 348, 70, 69, 72, 103, 210 R, 310

[56] References Cited

UNITED STATES PATENTS

| | | | |
|---|---|---|---|
| 2,697,852 | 12/1954 | Bailey | 264/95 |
| 3,284,552 | 11/1966 | Haley | 264/95 |
| 3,474,160 | 10/1969 | Doering | 264/40 |
| 3,231,651 | 1/1966 | Cheney | 264/95 |
| 3,296,343 | 1/1967 | Buttolph et al. | 264/95 |

FOREIGN PATENTS OR APPLICATIONS

| | | | |
|---|---|---|---|
| 1,444,624 | 8/1965 | France | 264/95 |

Primary Examiner—Robert F. White
Assistant Examiner—Jeffery R. Thurlow
Attorney—Wenderoth, Lind & Ponack

[57] ABSTRACT

In a method for manufacturing a tubular resinous film wherein a tubular film of a thermoplastic film is extruded from an extrusion nozzle, cooled, heated, expanded and wrapped into a roll, a circumferential twist is intermittently imparted to the tubular resinous film after it is cooled but before it is heated and expanded, or circumferential twists in the opposite directions are imparted alternately, by means of cooperating inner and outer rollers which are revolved in the circumferential direction of the tubular resinous film. Means to cool the extruded tubular resinous film comprises a first stationary cooling cylinder having a diameter slightly smaller than the inner diameter of the tubular resinous film, a second rotary cooling cylinder having a diameter slightly larger than that of the first cooling cylinder and adapted to contact and cool the inner surface of the extruded tubular resinous film, and means to form a layer of cooling gas between the inner surface of the extruded tubular resinous film and the periphery of the first cooling cylinder.

6 Claims, 7 Drawing Figures

HIROSHI NAGANO,
HIDEO TOMIOKA,
AKIRA YAMATAKA AND
HIROHIKO YOSHIDA
INVENTORS

HIROSHI NAGANO,
HIDEO TOMIOKA,
AKIRA YAMATAKA AND
HIROHIKO YOSHIDA
INVENTORS

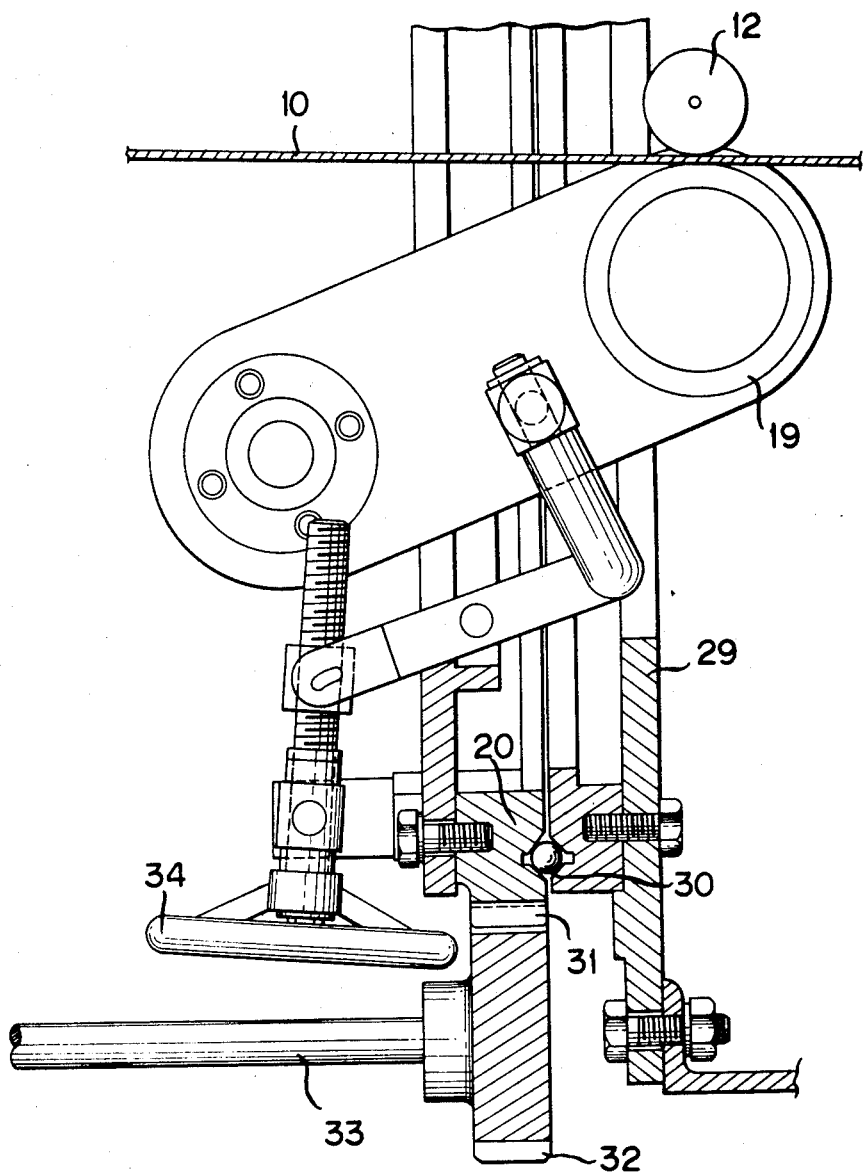

METHOD FOR MANUFACTURING TUBULAR FILMS OF THERMOPLASTIC RESINS

This application is a division of the applicants' co-pending patent application Ser. No. 750,036, filed Aug. 5, 1968, U.S. Pat. No. 3,635,634.

BACKGROUND OF THE INVENTION

This invention relates to a method for manufacturing tubular films of thermoplastic resins. More particularly, this invention relates to an improved method whereby it is possible to uniformly take up a tubular resinous film extruded from an extrusion nozzle and fold it into a flat sheet without forming an annular bulge or raised portion in the wrapped coil.

With recently increased demand for films of synthetic resins (hereinafter sometimes called "plastic film"), these films are often printed with letters or patterns or are used for automatic packaging. For these reasons, the conditions for the quality of plastic films are becoming more strict, and a pressing requirement of such films is that they be free of any local slack or wrinkle.

The manufacturing technique for plastic films has also made a significant advance. More particularly, an economical method of manufacturing plastic films has been proposed wherein a thermoplastic resin is extruded into a tubular form, the tube is then expanded and elongated by blowing air therein, folded into a flat sheet, and then wrapped into a roll. However, this method inevitably results in uneven thickness of the film due to non-uniformity of the slit width of the extrusion nozzle. As such uneven thickness is formed at a definite portion of the film depending upon the extrusion nozzle employed, when such a film with uneven thickness is wrapped into a roll, a bulge or raised portion is formed at definite portion along the periphery of the roll. The material of the resin at the raised portion is subjected to a tensile stress higher than those at other portions and is therefore elongated. Consequently, when the film is payed out from the roll, the portion of the film corresponding to the raised portion slackens, thus causing various troubles during use of the film. This is particularly detrimental when the film is printed or supplied to an automatic packing machine and the like. The effect of the bulge is more pronounced in the case of pliable films. Furthermore, in the case of heat shrinkable films, since there is a tendency to create a slight shrinkage, slack in the material may become so large that it precludes practical use of the material.

Thus, uneven thickness of the film causes much trouble, but control of the film thickness requires highly skilled technique and time. Even with minute care, it is difficult to completely eliminate uneven thickness, thus decreasing the yield of acceptable products.

However, if some means could be provided by which slack can be prevented at the time of application of the film, uneven thickness would not cause any difficulty.

When wrapping a plastic film into a roll, if portions of uneven thickness could be distributed along the length of the roll, the bulge would not be formed, thus obviating creation of local slacks in the film. According to one proposed method of distributing portions of uneven thickness, an extruding machine or an extrusion nozzle is rotated whereby the tubular film is taken up while it is twisted in the circumferential direction. However, the mechanism of such a rotary extruder is extremely complicated so that such a method cannot be applied to large size machines.

Further, with such a rotary extrusion nozzle the life of the machine is shortened due to the friction between the rotary extrusion nozzle and the machine support therefor. Heat of friction also decomposes the resin. Thus, the machine of this type is not suitable for the continuous operation over a long time.

In the manufacture of tubular films of thermoplastic resins, it is usual to extrude a resinous tubular member in the molten state, cool the tubular member and then elongate it from 1.5 to 10 times in both the longitudinal and transverse directions by a suitable operation. The cooling process for the molten tubular member has a great effect upon the subsequent elongation process and the characteristics of the tubular film after elongation. For this reason, in highly crystalline thermoplastic resins such as crystalline polypropylene, it is highly desirable to cool the molten tubular body in an extremely short period in order to prevent crystallization. Cooling of the molten tubular body has been performed by either directly cooling the outer surface of the tubular body by means of a pressurized gas or cooling liquid or by providing a water cooled jacket in the tubular body. Of these methods, the method wherein the outer surface alone is cooled cannot rapidly cool a tubular body having a relatively larger wall thickness prior to elongation. Moreover cooling is not uniform, thus causing rapid crystallization of the resin. This not only causes trouble in subsequent elongation process but also impairs the optical characteristics of the tubular film after elongation. To cool both the inner and outer surfaces of the tubular body, these two surfaces are simultaneously cooled directly by a cooling liquid or the inner surface is cooled by means of a water cooled jacket while the outer surface is cooled by falling water. However, each of these prior methods requires complicated apparatus. In addition, control of the cooling liquid is not easy. Especially, with the first method or the method wherein both the inner and outer surfaces are cooled by a cooling liquid, there are such defects that complete removal of the cooling liquid from the interior of the tubular body is difficult and that fluctuation of the liquid level results in non-uniform cooling. Accordingly, effective means for cooling extruded plastic film has been long desired.

SUMMARY OF THE INVENTION

We have discovered a novel method of preventing raised portions from being formed in a roll of an extruded tubular resinous film by twisting the film prior to the wrapping thereof into a roll, thus distributing raised portions without the necessity of rotating an extruder or an extrusion nozzle. The method of imparting a twist to the tubular resinous film is not novel. For example it has been proposed to provide a plurality of rollers which have axes parallel to the direction of extrusion of the tubular resinous film and disposed to engage the outer surface of the bulge, the inner surface thereof being under pressurized air. By rotating these rollers the friction created between rollers and the tubular resinous film functions to twist the film. With this method, however, unless all rollers for moving the resinous film have the same speed, wrinkles are formed in the resinous film before it is wrapped into a roll, thus resulting in non-uniform wrapping. Theoretically, it would be possible to impart the desired twist to the tubular resinous film without forming any wrinkle if all rollers were designed to have equal dimensions and rotational speed. However, in actual practice, the speeds of respective rollers effective to move the resinous film become slightly different due to such causes as slight variation in the air pressure acting upon the inner surface of the tubular resinous film, the surface condition of rollers, vibration of rollers, slip, and so forth.

It is therefore an object of this invention to provide a novel method for manufacturing tubular resinous films which can circumferentially twist the films and wrap them into rolls without forming wrinkles.

Another object of this invention is to provide a novel method for manufacturing tubular resinous films which can impart twist to tubular resinous films extruded from extrusion nozzles without forming any wrinkle and can wrap them into rolls uniformly at high speeds.

Still another object of this invention is to provide a novel cooling method for cooling tubular resinous films as they are extruded from the extrusion nozzle.

According to one aspect of the invention, these objects can be attained by providing a method whereby it is possible to impart circumferential twist to a tubular resinous film extruded from an extrusion nozzle, said method including the operation of a plurality of inner rollers having axes of rotation substantially perpendicular to the direction of extrusion of said tubular resinous film from said extrusion nozzle and maintained in contact with the inner surface of said tubular resinous film, and a plurality of outer rollers cooperating with respective inner rollers and having axes of rotation substantially parallel to those of corresponding inner rollers, both of said inner and outer rollers being disposed adjacent said extrusion nozzle and being revolved at the same angular speed in the circumferential direction of the tubular resinous film, thus twisting the same in the circumferential direction.

We have found that among various prior methods of wrapping a tubular resinous film into a roll, the method wherein the tubular film is folded into a flat sheet and then the sheet wrapped into a coil while the tubular resinous film is twisted in the circumferential direction is most economical.

Accordingly, a still further object of this invention is to provide an improved method of manufacturing a tubular resinous film which can distribute the portion of the film of uneven thickness along the length of a coil without forming any wrinkle in the film.

Thus, another aspect of this invention relates to an improvement of a method of continuously manufacturing a tubular resinous film which comprises the steps of cooling a tubular resinous film extruded from an extrusion nozzle, heating the tubular resinous film, expanding the tubular resinous film by the air pressure admitted therein, and folding said expanded tubular resin film into a flat sheet, said improvement being characterized by alternately repeating a step of twisting the tubular resinous film in the circumferential direction for a first interval and a step of stopping the twisting process for a second interval. Advantageously, these first and second intervals are made substantially equal to the interval during which the extruded tubular resinous film travels from the extrusion nozzle to a point at which the film begins to expand.

Alternatively, circumferential twists are imparted alternately in the opposite directions with a third interval interposed therebetween, during which the twisting operation is interrupted.

BRIEF DESCRIPTION OF THE DRAWING

In the accompanying drawing:

FIG. 5 is an enlarged view of a portion of the apparatus shown in FIG. 4;

DESCRIPTION OF PREFERRED EMBODIMENTS

Figure 1:
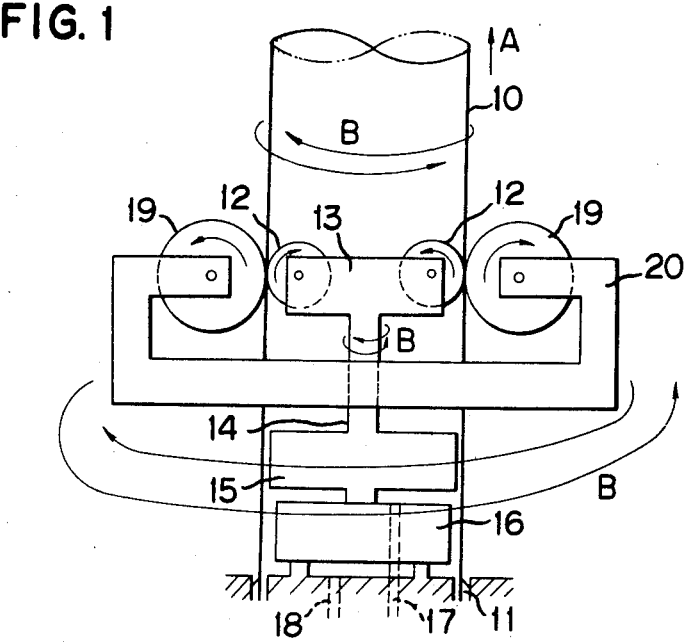
FIG. 1 shows a diagrammatic side elevation to explain the principle of the present invention.
Figure 2:
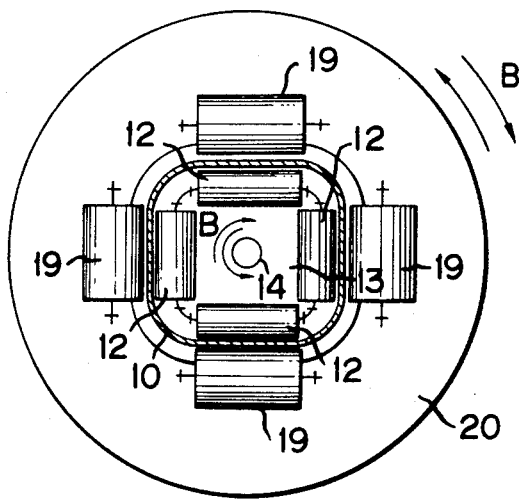
FIG. 2 is a plan view of the system shown in FIG. 1.

Referring now to FIGS. 1 and 2 of the accompanying drawing, a cylindrical resinous film 10 is extruded from an annular extrusion nozzle 11 of an extruding machine. Inside the film are provided a plurality of inner rollers 12 having axes perpendicular to the direction of movement of the film (indicated by an arrow A) and mounted on an inner support 13 to be urged against the inner surface of the film.

Inner support 13 is mounted on a rotary shaft 14 which also carries a rotary cooling former 15, and which is journalled by a stationary cooling former 16 having a smaller diameter than the rotary former so that inner rollers 12 can revolve in the circumferential direction along the inner surface of tubular resinous film 10.

These rotary and stationary formers 15 and 16 are in the form of hollow cylinders and are cooled by water, the rotary former being disposed to contact the inner surface of the resinous film. Whereas stationary former 16 is secured to extrusion nozzle 11, and since its diameter is slightly smaller than that of the rotary former, there is a small gap between the periphery of the stationary former and the tubular resinous film. Cooling gas such as air is admitted through an inlet pipe 17 and discharged through an outlet pipe 18 to form a thin film of cooling gas in the gap. A plurality of outer rollers supported by an outer support 20 are provided to contact against the outer surface of tubular resinous film 10, each of these outer rollers 19 being opposed to a corresponding one of inner rollers 12 and has an axis substantially parallel to the axis of the corresponding inner roller. As shown, four pairs of cooperating inner and outer rollers are provided, each located on one side of a square to clamp the resinous film therebetween. Accordingly, when rotary shaft 14 and outer support 20 are revolved in the circumferential direction of the resinous film at the same angular speed, the film is twisted circumferentially. As rollers 12 and 19 are rotated in the direction of extrusion A of the film. the revolution does not interfere with the movement of the film. Further, since the film is clamped between inner and outer rollers and since all rollers are revolved simultaneously, there is no slip between rollers and the resinous film, thus preventing any wrinkle from being formed in the resinous film. Stationary cooling former 16 cools the tubular resinous film immediately after extrusion thereof from the extrusion nozzle. Rotary cooling former 15 which is rotated with inner rollers 12 effectively cools the tubular resinous film while at the same time assisting twisting thereof. This cooling effected in two stages increases the extrusion speed of the resinous film, thus enabling high speed manufacturing of tubular resinous films.

Figure 3:
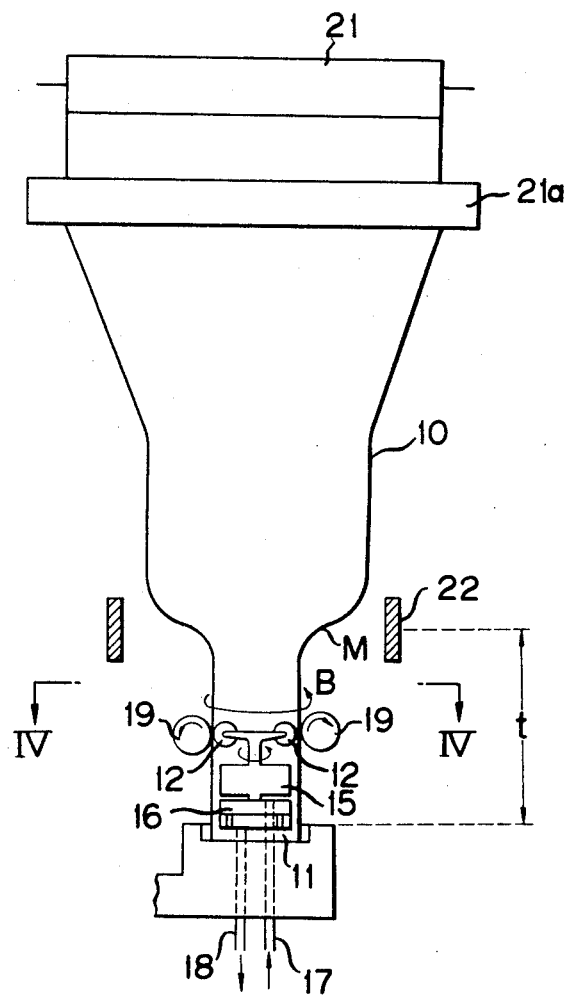
FIG. 3 is a diagrammatic side elevation to explain the operation of the present invention.

FIG. 3 is a diagrammatic side view, partly in section, showing the state of tubular resinous film 10 extruded from extrusion nozzle 11 of an extruder and wrapped around a take-up roll. Tubular resinous film 10 is cooled by stationary cooling former 16 and rotary cooling former 15 immediately after it has been extruded from the extrusion nozzle, then twisted in the circumferential direction by inner and outer rollers 12 and 19, heated and softened by the heat applied by a heater 22 and expanded and elongated by air supplied from inlet pipe 17. Finally the expanded tubular resinous film 10 is folded into a flat sheet by means of pinch rollers 21a and is then wrapped around a take-up roll 21.

Even when portions of uneven thickness are formed in the extruded film due to the characteristic of the extrusion nozzle 11, their positions are definite, and by the action of twist imparted to the film in the manner as described above, such thick portions are uniformly distributed along the length of the take-up roll, thus eliminating the bulge in the roll of the film.

Figure 4:
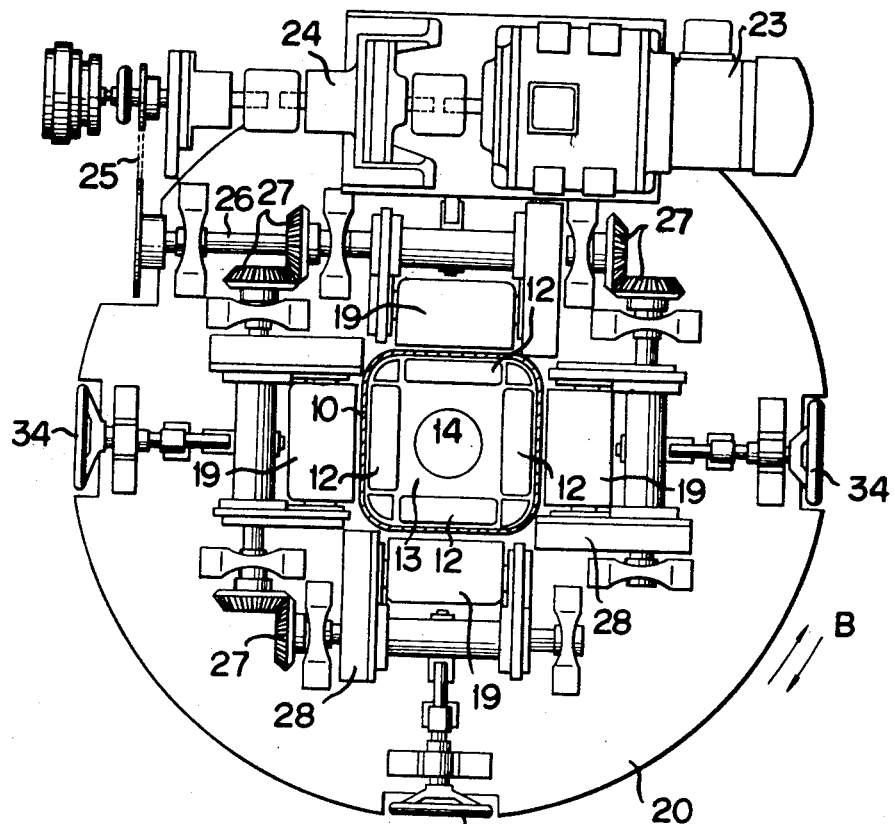
FIG. 4 is a plan view of one embodiment of this invention with a part in section generally taken along the line IV—IV in FIG. 3.

FIGS. 4 and 5 show a preferred embodiment of the apparatus according to this invention.

In FIGS. 4 and 5, reference numerals 12, 19, 20 10, and 14 designate the same parts as above. As shown, inner rollers 12 are mounted on inner support 13 with their axes substantially perpendicular to the direction of movement of tubular resinous film 10 to engage the inner surface thereof. At its center, inner support 13 is secured to the upper end of rotary shaft 14 which is journalled by stationary cooling former 16 secured to the extrusion nozzle. As shown in FIG. 4, an electric motor 23 is provided to drive four outer rollers 19 at the same speed to drive the resinous film in the direction perpendicular to the sheet of the drawing through a speed reduction mechanism 24, a belt 25, a shaft 26, and bevel gears 27. All of these components are mounted on outer support 20. Outer rollers 19 are supported by bearing pedestals 28 secured to support 20.

Support 20 is in the form an annulus surrounding the tubular resinous film and is supported by a stationary frame 29 through ball bearings 30. A gear 31 is formed on the periphery of the annular support 20 to mesh with a pinion 32 mounted on a shaft 33 which is driven by an independent driving device (not shown) whereby the support 20 is rotated in the direction of arrows B or in the circumferential direction of the tubular resinous film which is clamped between pairs of outer and inner rollers 19 and 12 and driven by the former.

Rotation of shaft 33 causes outer support 20 to rotate about the tubular resinous film, thus revolving outer rollers 19 supported thereby in the circumferential direction of the tubular resinous film. Consequently, inner rollers 12 as well as inner support 13 are revolved about the axis of shaft 14 at the same angular speed as the outer rollers, thus twisting the resinous film in the circumferential direction while it is moving in the direction of arrow A. To adjust the gap between inner and outer rollers, hand wheels 34 are provided.

In this manner, tubular resinous film 10 extruded from the extrusion nozzle is twisted in the circumferential direction before it is heated and expanded. After expansion the film is folded into a flat sheet by pinch rollers 21a and finally wrapped into a roll about take-up roll 21. As the circumferential twist is imparted to the tubular resinous film by revolving inner and outer rollers which clamp the film therebetween and having axes substantially perpendicular to the direction of extrusion of the film, such revolution does not interfere with the extruding operation of the resinous film. Further, incorporation of the rotary and stationary formers into the twisting mechanism enables high speed production of tubular resinous films. It should be understood that the number of pairs of inner and outer rollers is not limited to four, but any suitable number may be selected depending upon the diameter of the extrusion nozzle.

According to modified methods, twist is imparted intermittently or twists in opposite directions are imparted alternately to the tubular resinous film. According to the latter method, the tubular resinous film 10 is twisted in one direction by revolving inner and outer rollers 12 and 19 for an interval t which is equal to the time interval required for the film to travel from extrusion nozzle 11 to a point M which is surrounded by heater 22 and at which the film begins to expand. Thereafter, twisting is interrupted for the same interval t, that is the film is advanced without revolving inner and outer rollers. Then twist is imparted in the opposite direction for the same period by revolving the inner and outer rollers in the opposite direction. Thereafter twisting is interrupted for the same period. This cycle of operation is repeated.

As the film is soft immediately after it is extruded from the extrusion nozzle and also at point M the film is twisted very readily without forming wrinkles, thus distributing portions of the film of uneven thickness along the axial length of the take-up roll.

Figure 6:
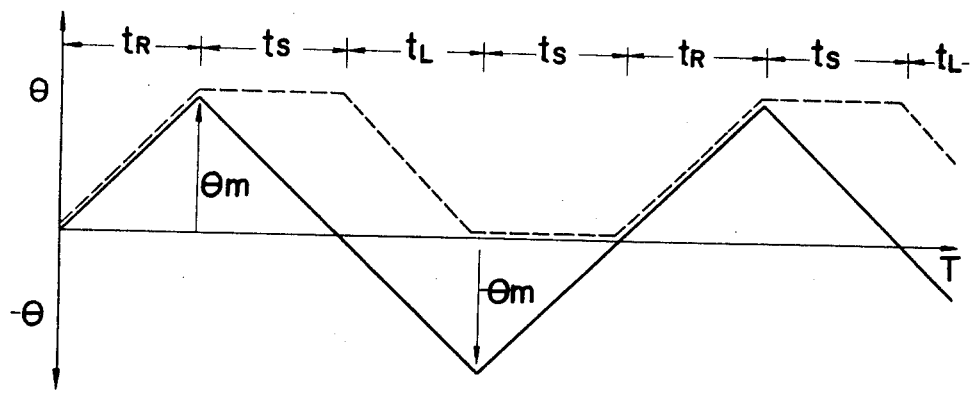
FIG. 6 is a graph to explain the operation of the present invention.

FIG. 6 illustrates one example of the twisting process. In this figure, the abscissa represents time T, the ordinate represents twist angle $\theta$ (it is assumed that the cross-sectional configuration of tubular resinous film 10 is circular), solid lines indicate the shift angle of the portion of uneven thickness of the film when it passes through expansion initiation point M, and dotted lines indicate the shift angle of support for outer rollers. Twist is continuously imparted to the film for a first interval $t_R$, interrupted for a second interval $t_S$, and imparted in the opposite direction for a third interval $t_L$, these intervals being substantially equal to the time interval t during which the film travels from the extrusion nozzle to the expansion initiating point M. Thus, $t_R = t_S = t_L = t$.

Angle $\theta_m$ is determined in accordance with the relationship between the extrusion speed (usually constant) of the tubular resinous film and angular speed $\omega$ of twist and can be expressed by $\theta_m = \omega \times t_R$.

As the film extruded from the extrusion nozzle is continuously twisted in one direction for a definite period, the portion thereof having uneven thickness is gradually shifted in the circumferential direction so that said portion passes point M at successively different angular positions. After passing through expansion initiating point M substantially no twist is applied to the film so that portions of uneven thickness are wrapped at the same angular positions as at point M.

After the elapse of interval $t_R$, twist is interrupted, whereby a particular portion of uneven thickness formed by the extrusion nozzle will not be shifted circumferentially, and the length of the tubular resinous film between the extrusion nozzle and the expansion initiating point has already been twisted. Then, at point M, this particular portion will be at the same angular position as it is formed by the extrusion nozzle.

After the elapse of interval $t_s$, twist is imparted in the opposite direction for interval $t_L$, thus gradually shifting portions of uneven thickness in the opposite direction. After the elapse of interval $t_L$, the twisting operation is stopped. Then, when passing through the expansion initiating point, portions of uneven thickness will be gradually restored to their original positions, that is, positions at which they are initially formed.

In this manner, portions of uneven thickness are shifted in one direction and then in the other direction by the above described cycle of operation including the steps of twisting in one direction, interrupting twisting, twisting in the opposite direction, and interrupting twisting.

The circumferential length of the tubular resinous film along which portions of uneven thickness are distributed can be expressed by 2 $\theta_m$ (radians). Thus, for example where $\theta_m = \pi/2$ radians, $\pi/2$ said length is equal to $\pi$ radians. In other words, portions of uneven thickness are distributed over the entire width of the folded sheet wrapped around take-up roll 21. In this way, uniformly wrapped rolls can be formed without creating any wrinkle.

Although angular speed $\omega$ at which the twist is imparted is determined essentially in accordance with the take-up speed V of the resinous film, it also depends upon the type of the resin. For example tubular films of polyethylene are ordinarily taken-up at a speed of from about 5 to 9.5 m/sec. If in this case twist is imparted at a speed exceeding 10 rpm, care should be taken not to form wrinkles at softened portions of the tubular resinous film, for example, at expansion initiating point M.

Alternatively, twist can be imparted by a cycle of operation including the steps of twisting and interrupting twisting. In this modified method, the twisting process in the opposite direction is eliminated. In this case, also, it is possible to distribute portions of uneven thickness along the entire width of the folded film by so adjusting angular speed $\omega$ of twist that $\theta_m$ becomes equal to $\pi$ radians. Although it has heretofore been difficult to twist tubular resinous films, this invention has succeeded in solving this problem.

The following are examples of the novel method.

Example 1

When extruding a tubular film of heat shrinkable vinyl chloride resin, the portion of uneven thickness was marked with an ink immediately after it was extruded from the extrusion nozzle. Circumferential shift was observed by the shift of the ink mark, the amount of shift being expressed by an angle subtended by the shifted length.

Parameters utilized were as follows. Feed speed of rollers 19 was 8m/min. Take-up speed of the film after expansion was 18m/min. The ratio of diameter of the extrusion nozzle to the diameter of the tubular resinous film after expansion was 1:2.5. Under these conditions the direction of twist was reversed at a definite period. Twisting speed was 1.67 rpm, twist was imparted by a cycle including twisting in one direction for 18 seconds, interrupting twist for 18 seconds, twisting in the opposite direction for 18 seconds at the same twisting speed, and interrupting twisting for 18 seconds.

The ink mark applied to the portion of uneven thickness at the exit end of the extrusion nozzle shifted gradually from the center of the take-up roll toward its one end, then shifted to the opposite end and finally shifted back to the center. Thus portions of uneven thickness were distributed over a width of 360°. By repeating the above cycle of operation, a roll of film was formed having no bulge and having uniform diameter throughout the entire length.

Example 2

As in example 1, an ink mark was applied to a portion of uneven thickness of a film. In this case, the feed speed of rollers 19 was 5m/min, the take-up speed of the film after expansion was 12m/min, the ratio of extrusion nozzle diameter to the diameter of the tubular resinous film after expansion was 1:2.4, and twist in one direction was imparted at a definite period. Twisting speed was 2 rpm. Twist was imparted for 15 seconds and then stopped for 15 seconds. The ink mark shifted gradually from one end to the other of the take-up roll and then returned to the original position. Thus the ink mark was distributed over a width of 180°. By repeating the above described cycle, a roll of resinous film having uniform diameter and free from any bulge was obtained.

Example 3

The same process as in example 2 was followed except that the twisting speed was increased to 4 rpm. As a consequence portions of uneven thickness were distributed over a width of 360°.

Figure 7:
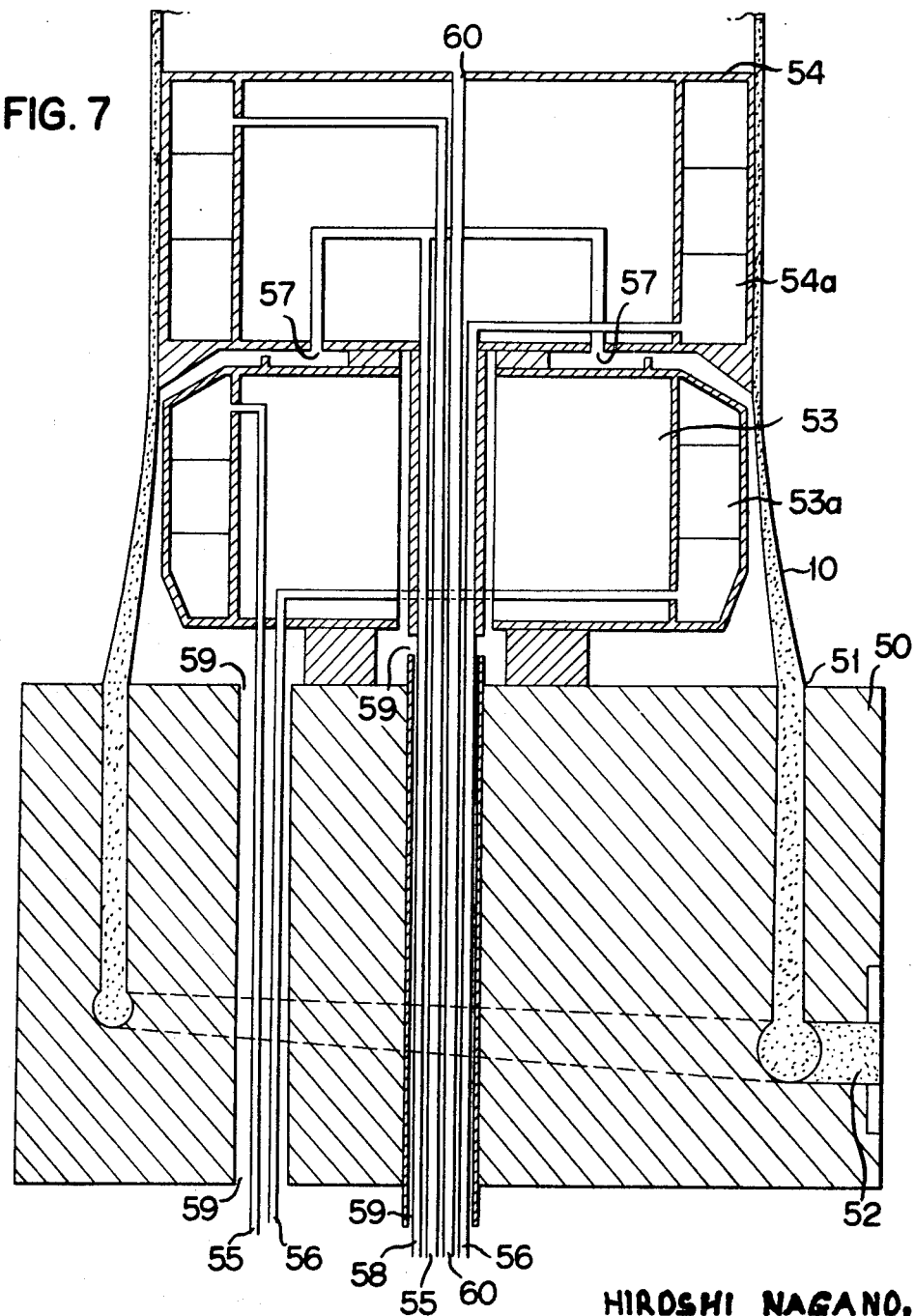
FIG. 7 is a sectional view of cooling means according to the invention.

FIG. 7 shows a detailed sectional view of an extrusion nozzle and water cooled formers.

An annular extrusion nozzle 51 is provided through an extrusion head 50, and a resin inlet port 52 leading to extrusion nozzle 51 is connected to an extruder, not shown. A first cooling cylinder or former 53 is secured to extrusion head 50 on the exit end of the nozzle and a second cooling cylinder or former 54 having a diameter slightly larger than the first cylinder is provided above it. The second cooling cylinder is rotatably supported by the first cooling cylinder. These cylinders are provided with water jackets 53a and 54a, respectively, through which cooling water is circulated through inlet pipes 55 and outlet pipes 56. Air under pressure is introduced to flow around the periphery of the first cylinder through an air inlet pipe 58 and openings 57 through the bottom wall of the second cylinder and is discharged through outlet pipes 59. A tubular resinous film 10 extruded by extrusion nozzle 51 is cooled by the first and second cooling cylinders and is then twisted and expanded in the manner as above described. Expansion is effected by the air supplied through a pipe 60. As described before, the first cooling cylinder 53 has a diameter slightly smaller than that of the second cooling cylinder 54 and an air film is formed around the first cooling cylinder. The ratio of outer diameters of the first and second cooling cylinders and the pressure of air supplied through inlet pipe 58 are so selected that the tubular resinous film will not contact with the periphery of the first cylinder when the film contracts by being cooled by the pressurized air, but will make light contact with the periphery of the second cooling cylinder and effectively cooled thereby. Accordingly the tubular resinous film is cooled by the air layer around the first cooling cylinder immediately after it is extruded from the extrusion nozzle and is then cooled by the second cooling cylinder.

With this construction, although the length of contact between the resinous film and the cooling cylinder is relatively short, the effective length of cooling is relatively long. Air film around the first cooling cylinder not only prevents direct contact between them but also provides the dual function of cooling and lubrication so that the resinous film is rapidly cooled while it is still soft. This results in an increase in the take-up speed of the resinous film. It was found that the take-up speed was increased 1.5 to 3 times when compared with that of the conventional cooling device.

As mentioned above, when manufacturing a tubular film of a thermoplastic resin by the method described above, that is, by a method comprising the steps of cooling the extruded tubular resinous film, heating the cooled film, and expanding and elongating the film, cooling before commencing expansion and elongation is an important factor that determines the physical characteristics, especially the optical characteristic such as light transmissibility, of the product. The above described cooling device was found to improve the physical characteristics of the finished resinous film.

While the invention has been described in terms of preferred embodiments thereof, it will be obvious to one skilled in the art that many changes and modifications may be made therein without departing from the scope of the invention as defined in the appended claims.

We claim:

1. A method of manufacturing a tubular resinous film comprising the steps of extruding a tubular resinous film from a stationary extrusion nozzle; cooling said resinous film to a solid state immediately after it has been extruded; imparting a circumferential twist to said tubular resinous film for a first predetermined period after said cooling by passing said resinous film between a plurality of cooperating pairs of inner and outer rollers, the axes of rotation of which are substantially perpendicular to the direction of extrusion of said resinous film, rotating said rollers in contact with said film, and simultaneously revolving said inner and outer rollers circumferentially of said resinous film; interrupting said twist for a second predetermined period by discontinuing said revolving; said steps of imparting the twist and interrupting the twist being repeated alternately; heating said twisted resinous film to a stretchable state; expanding said heated tubular resinous film to have a diameter 1.5 to 10 times as great as that of the tubular resinous film immediately after said extrusion by introducing pressurized gas into said tubular resinous film; folding said expanded resinous film into a flat sheet; and wrapping said sheet into a roll; said first and second predetermined periods being substantially equal to the interval during which the extruded tubular resinous film travels from said extrusion nozzle to a point at which said heated tubular film begins to expand.

2. The method according to claim 1, wherein said circumferential twist is made at an angle $\theta m$ which is expressed by $\theta m = \omega \times t_R$ where $\omega$ represents the angular speed of twist and $t_R$ said first predetermined period.

3. The method according to claim 1 wherein said cooling is effected in two stages, in the first stage the tubular resinous film is cooled by a stream of gas flowing through an annular space between the inner wall of said tubular resinous film and a stationary cooling former and in the second stage the tubular resinous film is cooled by direct contact with a rotary cooling former.

4. A method of manufacturing a tubular resinous film comprising the steps of extruding a tubular resinous film from a stationary extrusion nozzle; cooling said resinous film to a solid state immediately after it has been extruded; imparting a circumferential twist in a first direction to said tubular resinous film for a first predetermined period after said cooling by passing said resinous film between a plurality of cooperating pairs of inner and outer rollers, the axes of rotation of which are substantially perpendicular to the direction of extrusion of said resinous film, rotating said rollers in contact with said film, and simultaneously revolving said inner and outer rollers circumferentially of said resinous film; interrupting said twist for a second predetermined period by discontinuing said revolving; imparting a circumferential twist in the opposite direction to said tubular resinous film for a third predetermined period by reinitiating said revolving in the opposite circumferential direction; said steps of imparting the twist in said one direction, interrupting the twist and imparting the twist in said opposite direction being repeated cyclically; heating said twisted resinous film to a stretchable state; expanding said heated tubular resinous film to have a diameter 1.5 to 10 times as great as that of the tubular resinous film immediately after said extrusion by introducing pressurized gas into said tubular resinous film; folding said expanded resinous film into a flat sheet, and wrapping said sheet into a roll; said first, second and third predetermined periods being substantially equal to the interval during which the extruded tubular resinous film travels from said extrusion nozzle to a point at which said heated tubular resinous film beings to expand.

5. The method according to claim 4, wherein said circumferential twist is made at an angle $\theta m$ which is expressed by $\theta m = \omega \times t_R$ where $\omega$ represents the angular speed of twist and $t_R$ said first predetermined period.

6. The method according to claim 4 wherein said cooling is effected in two stages, in the first stage the tubular resinous film is cooled by a stream of gas flowing through an annular space between the inner wall of said tubular resinous film and a stationary cooling former and in the second stage the tubular resinous film is cooled by direct contact with a rotary cooling former.

* * * * *